(12) United States Patent
Holt

(10) Patent No.: US 8,155,475 B2
(45) Date of Patent: Apr. 10, 2012

(54) METHOD AND APPARATUS TO FACILITATE TRANSFORMING GRAYSCALE LEVEL VALUES

(75) Inventor: Kevin Holt, Chicago, IL (US)

(73) Assignee: Varian Medical Systems, Inc., Palo Alto, CA (US)

(*) Notice: Subject to any disclaimer, the term of this patent is extended or adjusted under 35 U.S.C. 154(b) by 1053 days.

(21) Appl. No.: 12/046,060

(22) Filed: Mar. 11, 2008

(65) Prior Publication Data

US 2008/0226167 A1 Sep. 18, 2008

Related U.S. Application Data

(60) Provisional application No. 60/894,336, filed on Mar. 12, 2007.

(51) Int. Cl.
*G06K 9/40* (2006.01)

(52) U.S. Cl. ......... 382/274; 382/165; 382/275; 358/2.1; 358/3.27

(58) Field of Classification Search .................. 382/164, 382/165, 167, 274, 275
See application file for complete search history.

(56) References Cited

U.S. PATENT DOCUMENTS

| | | | |
|---|---|---|---|
| 6,275,718 B1* | 8/2001 | Lempert | 600/407 |
| 6,345,235 B1* | 2/2002 | Edgecombe et al. | 702/27 |
| 6,490,048 B1* | 12/2002 | Rudd et al. | 356/601 |
| 6,583,884 B2* | 6/2003 | Rudd et al. | 356/601 |
| 6,919,892 B1* | 7/2005 | Cheiky et al. | 345/473 |
| 7,477,802 B2* | 1/2009 | Milanfar et al. | 382/299 |
| 7,508,550 B2* | 3/2009 | Kameyama | 358/3.23 |
| 7,643,665 B2* | 1/2010 | Zavadsky et al. | 382/141 |
| 7,840,066 B1* | 11/2010 | Chen et al. | 382/168 |

OTHER PUBLICATIONS

Russ; The Image Processing Handbook, Fourth Edition; pp. 211-219; CRC Press; 2002.

* cited by examiner

*Primary Examiner* — Yosef Kassa

(74) *Attorney, Agent, or Firm* — Fitch Even Tabin & Flannery, LLP

(57) ABSTRACT

An image processing apparatus (800) partitions (101) an image into a plurality of blocks. For a selected one of these blocks, the apparatus then uses a given available range of grayscale level values to determine (102) grayscale level values for image data in the selected block to provide corresponding determined grayscale level values. At least some of these determined grayscale level values are then transformed (103) to thereby use an altered amount of the given available range of grayscale level values to thereby provide rescaled grayscale level values for the selected block.

28 Claims, 2 Drawing Sheets

METHOD AND APPARATUS TO FACILITATE TRANSFORMING GRAYSCALE LEVEL VALUES

RELATED APPLICATION(S)

This application claims the benefit of U.S. Provisional Application No. 60/894,336, filed Mar. 12, 2007, which is incorporated by reference in its entirety herein.

TECHNICAL FIELD

This invention relates generally to image processing and more particularly to the processing of images that are comprised of image data having grayscale level values.

BACKGROUND

Images comprised of data having grayscale level values are known in the art. As used herein, grayscale-based images shall be understood to comprise images where the value of each pixel is a single value which will ultimately be interpreted by some rendering platform as values (such as intensities) to be displayed (or analyzed). Displayed images of this sort are typically composed of shades of gray (hence the moniker "grayscale") although any color (or, indeed, different colors) can serve in this regard. For any particular grayscale standard, there is a given available range of grayscale level values. For the sake of illustration, for example, a given grayscale standard might provide for one hundred different values which represent a range of black at the weakest intensity to white at the strongest intensity or, as another example, blue at the weakest intensity to red at the strongest intensity.

In some application settings, the use of grayscale-based images can yield, in the first instance, images having relatively indistinct features. A typical radiographic image, when rendered as a grayscale-based image, can have a high dynamic range that makes fine detail very difficult to see in all regions of a single rendered image. In many cases, such fine detail is discernable in bright regions of the image, or in dark regions, but not in both simultaneously.

Adaptive histogram equalization comprises a known technique to address this concern. By this approach, one divides the image into (typically overlapping) blocks. For each block, one then calculates the histogram of the block's grayscale levels; that is, how many times each grayscale level occurs in each block. An optimal non-linear equalization function is then derived from this histogram and applied to the block's grayscale levels. This function is often derived so that if the histogram of the processed block were calculated, the result would be very close to flat (such that all grayscale levels are used approximately the same number of times). The function is applied to each block and the results from overlapping blocks are then averaged together.

Unfortunately, such an approach is not necessarily appropriate or useful in all application settings. This approach, for example, tends to be computationally intensive as it requires that a full histogram be calculated for each block which comprises the image. This approach also requires that the aforementioned non-linear equalization function be determined and applied for each of the blocks.

BRIEF DESCRIPTION OF THE DRAWINGS

The above needs are at least partially met through provision of the method and apparatus to facilitate transforming grayscale level values described in the following detailed description, particularly when studied in conjunction with the drawings, wherein.

Figure 1:
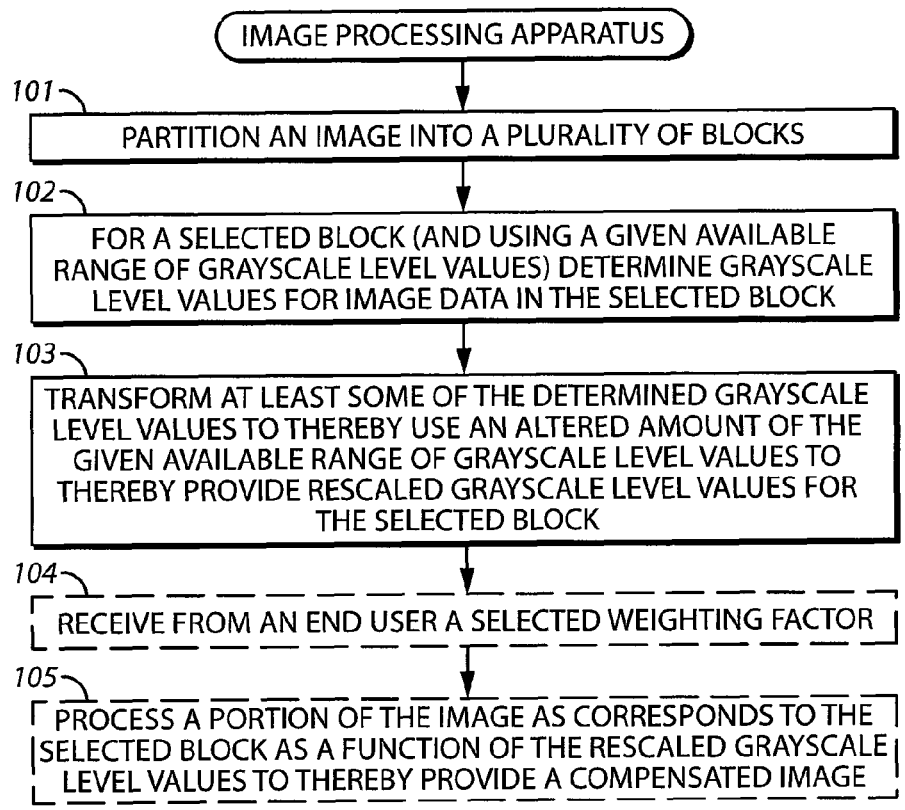
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an image processing apparatus partitions an image into a plurality of blocks. For a selected one of these blocks, the apparatus then uses a given available range of grayscale level values to determine grayscale level values for image data in the selected block to provide corresponding determined grayscale level values. At least some of these determined grayscale level values are then transformed to thereby use an altered amount of the given available range of grayscale level values to thereby provide rescaled grayscale level values for the selected block.

By this approach, and by way of example, a least intense grayscale level value in the block can be transformed to have a grayscale level value that represents the least intense grayscale level value in the given available range of grayscale level values. A most intense grayscale level value in the block can be similarly transformed to have the most intense grayscale level value in the given available range of grayscale level values. Intervening values can be similarly transformed as desired and appropriate.

The resultant rescaled grayscale level values can then be used when processing the image to thereby provide a compensated image. By one approach, this can comprise combining the image with the rescaled grayscale level values. If desired, this can include applying a weighting factor to the image data, the rescaled grayscale level values, or both. The weighting factor can be automatically determined, can be input by an end user, or both. By another approach, no weighting is performed, and the compensated image is formed by assembling the rescaled gray levels.

Those skilled in the art will appreciate that these teachings, while highly effective to achieve the intended purpose, require only modest computational support. Instead of requiring the calculation of a full histogram for each block, for example, these teachings can be beneficially applied when locating only a minimum and a maximum value for each block. Similarly, these teachings can provide beneficial results even when one only calculates two coefficients for each block in lieu of the complicated full histogram processing that leads to generating a complete non-linear equalization function. It will be further appreciated that these teachings are highly flexible and will support numerous variations with respect to their application. It will also be recognized and appreciated that these teachings are highly scalable and can be effectively applied with a wide variety of image data, image resolutions, image sizes, and so forth.

These and other benefits may become clearer upon making a thorough review and study of the following detailed description. Referring now to the drawings, and in particular to FIG. 1, an illustrative process that is compatible with many of these teachings will now be presented. This process 100 can be carried out by a corresponding image processing apparatus of choice. This may comprise a dedicated platform or a platform that shares its processing capabilities in favor of other functionality as well. Those skilled in the art will also understand that this image processing apparatus can comprise a single platform or can comprise a functionality that is distributed over a plurality of different platforms.

This process 100 is applied with respect to a given image. The source and nature of this image can of course vary with respect to the application setting. By way of illustration and not by way of limitation, this description will presume this image to comprise a digital radiographic image.

To begin, this process 100 provides for partitioning 101 this image into a plurality of blocks. This step will accommodate a wide variety of approaches in this regard. As one example in this regard, and referring momentarily to FIG. 2, this can comprise partitioning the image 201 into rectangular blocks 202 that are each of a same size and abut one another such that there is no overlapping between any blocks, there are no gaps between any of the blocks, and all areas of the image 201 are included within one of the blocks. As another example, and referring now momentarily to FIG. 3, there may be some areas of the image 201 that are not included within such a block 301 and it would also be possible, if desired, for one or more of these blocks 301 to not abut another block for at least a portion of its internal periphery.

Figures 2, 3, 4:
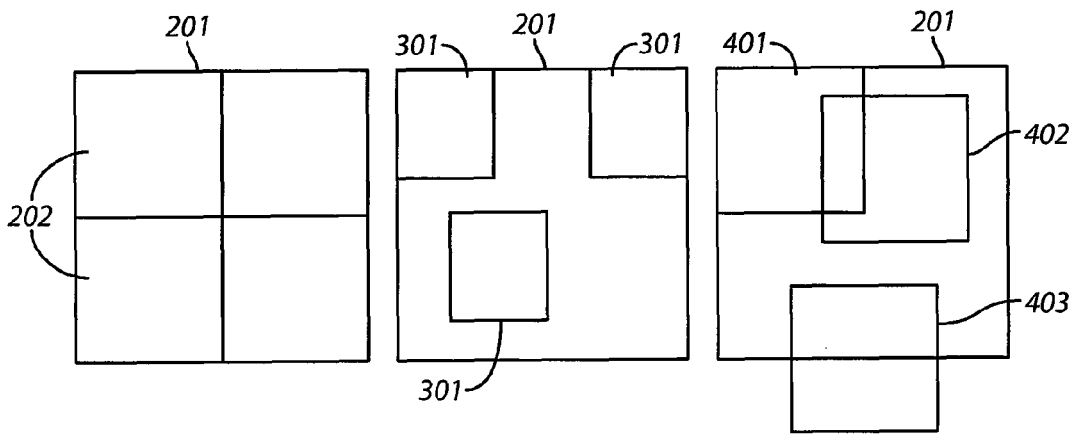
FIG. 2 comprises a schematic representation as configured in accordance with various embodiments of the invention.
FIG. 3 comprises a schematic representation as configured in accordance with various embodiments of the invention.
FIG. 4 comprises a schematic representation as configured in accordance with various embodiments of the invention.

As yet another example in this regard, and referring now momentarily to FIG. 4, it would also be possible for a first block 401 to overlap, in whole or in part, with at least one other block 402. By one approach, this overlapping can be a function, at least in part, of a selection (by, for example, an end user) of a particular amount of overlap from amongst a plurality of available candidate amounts of overlap. As one illustrative example in these regards, it would be possible to restrict such a list of candidates to those amounts of overlap that ensure that all pixels, with the exception of those at the border of the image, are each a member of a same number of blocks. To further illustrate by way of a non-limiting example, for 8×8 blocks, the only allowable options could be for the blocks to be spaced by 1 pixel, 2 pixels, 4 pixels, or 8 pixels in each direction. This would correlate to neighboring blocks overlapping by 7 pixels, 6 pixels, 4 pixels, or 0 pixels in a given direction, respectively.

Also, and as illustrated by the block denoted by reference numeral 403, it can be possible, if desired, for one or more of the blocks to extend beyond the periphery of the image 201 and thereby include a non-image area within the boundaries of such a block 403. The latter approach may be particularly useful in an application setting where the blocks are all of an equal size.

In the illustrative examples provided above, the blocks are rectangular in shape. These teachings will accommodate other possibilities, however. For example, these teachings can be employed in conjunction with hexagon-shaped blocks, circular-shaped blocks, and so forth. It would also be possible, if desired, to provide blocks of varying sizes, such that not every block has a same size. Choosing from amongst these various possibilities would likely be influenced by the particulars of a given application setting. For example, using blocks of different sizes may be useful with images where certain image areas are likely the subject of relatively greater activity. In such a case, smaller blocks could be used for the more active areas (such as in the center of the image) and larger blocks could be used where the activity is expected to be less (such as at the edge of the image). Determining which sized blocks to use, and where, can comprise a static setting, an end-user selectable setting, or can be automatic as will be well understood by those skilled in the art.

By one approach, the size of the blocks can be fixed and unvarying. By another approach, the size of the blocks can vary, for example, from one image to another. The variability can comprise an automatic capability or, if desired, this process can be receptive to a user-selected parameter regarding a size of the blocks. Such a parameter might comprise, for example, a specification regarding a literal dimension of the block or a more relative characterization (as when the user specifies how many blocks are to comprise the partitioning).

Referring again to FIG. 1, this process 101 then provides for taking a selected block and using a given available range of grayscale level values to determine 102 grayscale level values for image data in the selected block. Various practices are known in this regard. By one approach, for example, with an n-bit palette, the range begins with "0" (for the darkest level) and extends to $2^n-1$ by integer-based incremental values. As another example, the values range from "0" to "1" by fractionally-based incremental values. Other possibilities of course exist.

Figure 5:
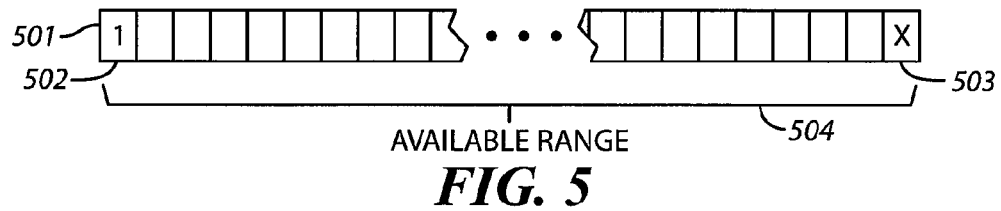
FIG. 5 comprises a schematic representation as configured in accordance with various embodiments of the invention.

This notion of a given available range of grayscale level values can be explained with momentary reference to FIG. 5. As noted earlier, a given grayscale standard will specify values for each of a sequence 501 of levels of gray that is bounded by a darkest level 502 and a lightest level 503. In this illustrative example, the darkest level 502 has the corresponding value of "1" while the lightest level 503 has the corresponding value of "X" (where "X" can comprise any integer greater than one). This sequence 501 is hence seen to provide a given available range 504 of values by which various levels of gray in the image can be assigned. Various grayscale standards are known in the art. Some provide only a relatively small available range of values (such as eight to sixteen such values) while others provide a considerably larger range of values (such as hundreds, thousands, or millions of such values).

By one approach, this given available range of grayscale level values can be identical for each of the aforementioned blocks. By another approach, the range can vary from one block to the next in accordance with some corresponding scheme or criterion.

Figure 6:
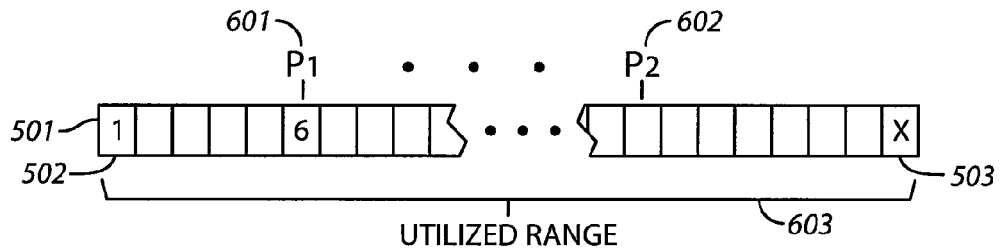
FIG. 6 comprises a schematic representation as configured in accordance with various embodiments of the invention.

It will therefore be understood that this step 102 of determining grayscale level values for image data in the selected block essentially comprises assigning values from the available range of values to image pixels as a function of the lightness and darkness of those pixels. In many cases, these determined grayscale level values will not utilize the full available range of such values. To illustrate this point, consider the example presented in FIG. 6. For a given block the darkest pixel P1 601 correlates to a grayscale level value of "6" and the lightest pixel P2 602 in turn correlates to a grayscale level value that is less than the lightest available grayscale level value X 503. Accordingly, it can be seen that for many images, the utilized range 603 of grayscale level values will be less than the available range for such values.

Referring again to FIG. 1, this process 100 now provides for transforming 103 at least some of the determined grayscale level values by employing an analytic function of choice. This can comprise, for example, transforming at least some of the determined grayscale level values to thereby use an altered amount of the given available range of grayscale level levels to thereby provide transformed grayscale level values for the selected block. Again, there are various ways by which this can be achieved.

As one example in this regard, this can comprise measuring several statistics for the selected block. These measured statistics can then be used to automatically design a transformation which, when applied to the data, will cause the grayscale levels to occupy an altered (typically enlarged) amount of the given available range of grayscale level values.

To illustrate, this can comprise identifying a first one of the determined grayscale level values that best matches a first selection criterion (such as, for example a first selection criterion that comprises a least significant value using the range of grayscale values). This can also comprise identifying a second one of the determined grayscale level values that best matches a second selection criterion (which is different than the first selection criterion). For example, when the first selection criterion comprises a least significant value, the second selection criterion can comprise a most significant value. By this approach, then, one is identifying the darkest and the lightest pixels in the selected block.

Those skilled in the art will appreciate that other similar approaches may suffice in a given application setting. As one example, one could search for the minimum and maximum in only the even-numbered rows and even-numbered columns within each block rather than searching the whole block. This approach would save time by only searching twenty-five percent of the pixels and may not unduly comprise the end result (at least in some cases). As yet another example in this regard, one could measure the min, mean, max, and standard deviation.

Figure 7:
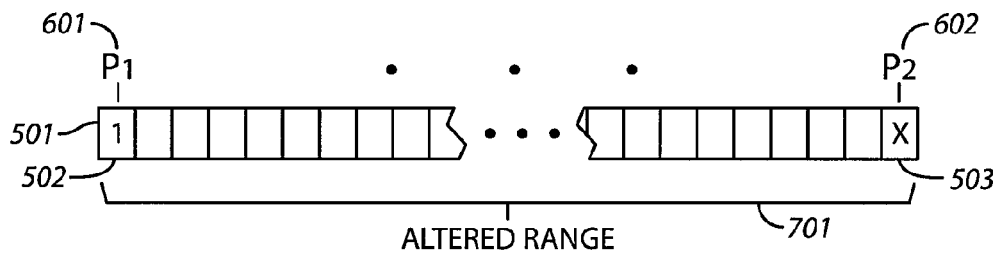
FIG. 7 comprises a schematic representation as configured in accordance with various embodiments of the invention.

The transformation activity can then comprise, and again by way of illustrative example, transforming at least some of the grayscale level values to have values that correspond to other values within the given available range of grayscale level values. As one simple example of the results of such a transformation, and referring momentarily to FIG. 7, might comprise transforming the darkest pixel P1 601 to now have the value of the darkest available value 502 in the available range of values 501 and transforming the lightest pixel P2 602 to now have the value of the lightest available value 503 in the available range of values 501. In this example, the remaining intervening pixels would be transformed as well over the now expanded range of values. Overlapping information, to the extent it exists, can be accommodated as desired. By one approach, overlapping information can be blended together using a combining technique of choice, such as averaging.

Different possibilities exist for the transform. By one approach, the values are rescaled through a linear transformation. For the example presented above where the minimum and maximum values are found for the block, this equates to assigning the minimum to some desired value (say, black), the maximum to some other desired value (say, white), and proportionately rescaling all intervening values. By another approach, the values are fed through a nonlinear function, such as a polynomial, a logarithm, or a combination of multiple such functions, or a combination of multiple such functions along with linear operations. In general, a wide range of arbitrary parametric transformations are allowed, where the parameters of the transformation are first calculated as a function of the identified statistics (generally, so that the output of the transformation will occupy a desired range of output levels), then the transformation is applied to the at least some of the determined grayscale values. The user could also be able to choose the type of transformation from a list of several choices. Note that the calculation of the transform parameters will generally involve only a small number of relatively simple analytic calculations, and the calculation of the transform itself will also generally involve only a small number of relatively simple analytic calculations for each pixel. In contrast, adaptive histogram equalization generally must rely on lookup tables, where to generate the equalization function (which serves a similar function as the transformation activity described here), one must process a full histogram to generate a lookup table (which can sometimes be large), and to apply the equalization function, one must perform a table lookup for every pixel location. Especially when using analytic functions that can be quickly evaluated, these teachings can therefore offer a significant time savings.

So configured, the values for the grayscale levels of the pixels for the image now occupy an altered range 701 as compared to their original utilized range 603. By expanding that range as described, contrast can increase in the image and a greater degree of difference between pixels that previously had very similar values can be obtained. This, in turn, can lead to significantly improving the ease by which a human observer can identify features of interest within the image.

If desired, this process 100 will also optionally accommodate processing 105 a portion of the image as corresponds to the selected block as a function of the rescaled grayscale level values for the selected block to thereby provide a compensated image. By one optional approach, by way of illustration, this could comprise combining the portion of the image as corresponds to the selected block with the rescaled grayscale level values for that selected block. Various options exist in this regard. For example, by one simple approach, the values for a given pixel can be averaged together to provide the combined result.

By another approach, such processing can be carried out as a function of weighted versions of the rescaled grayscale level values for the selected block and/or the original pixel values. The weighting value(s) itself can comprise a fixed parameter or can comprise a dynamic component. When dynamic, the particular value to use as a weighting factor can be automatically determined or can, if desired, be optionally received 104 from an end user. As one simple example in this regard, a weighting factor of 50% could be applied to cause one half of the rescaled grayscale level values to be used while retaining one half of the original values. Similarly, a 100% weighting factor would cause all of the rescaled grayscale levels to be used to the complete exclusion of the original values.

A more detailed explanation of certain possibilities in these regards will now be presented. Those skilled in the art will recognize that these additional details are offered by way of illustration and are not intended to serve as an exhaustive example and are not to be taken as any indication of a limitation with respect to these teachings. To facilitate this description, the following nomenclature will apply:

As to images:

X(col,row) Input image, Ncol×Nrow

Y(col,row) Output image, Ncol×Nrow

As to various parameters:

BlockSize refers to the size of the blocks.

OverlapFactor refers to a ratio of BlockSize to the amount by which the blocks overlap with one another. OverlapFactor must be an integer $\geq 1$, and must divide evenly into BlockSize. For example, for 10×10 blocks, allowed OverlapFactors are 1, 2, 5, or 10.

Strength refers generally to the strength of filter and more particularly to the aforementioned weighting factor; the parameter comprises a floating point value ranging from 0 (for no enhancement) to 1 (for maximum enhancement).

NewMax refers to the desired maximum level after rescaling. Typically, for an n-bit palette with integer indexing, this will be set to $2^n-1$ NewMin refers to the desired minimum level after rescaling. Typically, this will be set to 0.

A corresponding process can proceed as follows:

Zero the output image:

$$Y(col,row)=0$$

Find the block increment:

$$Inc=(BlockSize/OverlapFactor)$$

Find how many times one must increment to cover the whole image:

$$Mcol=(Ncol/Inc)$$

$$Mrow=(Nrow/Inc)$$

Letting h be the block number in the horizontal direction, and v the block number in the vertical direction, and further letting x be the pixels in the current block:

For each $0 \leq h \leq (Mcol-1)$ and $0 \leq v \leq (Mrow-1)$ do the following:

Look up the block of interest:

For $0 \leq 0 \leq i \leq$ (BlockSize−1) and $0 \leq j \leq$ (BlockSize−1) do $$x(i,j)=X(h \times BlkSize+i, v \times BlkSize+j)$$

Find the minimum and maximum of the block:

$$x_{min} = \min_{i,j} x(i,j)$$

$$x_{max} = \max_{i,j} x(i,j)$$

Find the linear correction coefficients for the block:

$$a = \frac{\left(1 + \text{strength} \times \left(\frac{NewMax}{x_{max} - x_{min}} - 1\right)\right)}{OverlapFactor^2}$$

$$b = \frac{\text{strength}}{OverlapFactor^2} \times \frac{NewMax \times x_{min}}{x_{max} - x_{min}}$$

Apply coefficients, and accumulate the output:

For $0 \leq 0 \leq i \leq$ (BlockSize−1) and $0 \leq j \leq$ (BlockSize−1) do $$Y(h \times BlkSize+i, v \times BlkSize+j) = Y(h \times BlkSize+i, v \times BlkSize+j) + a \times x(i,j) - b$$

Note that for computational speed, the a and b coefficients include terms for rescaling the grayscale values, averaging overlapping blocks, and weighting with the original image. Thus all three operations can be performed with a single multiply and a single add for each pixel in the block. It should be noted that all three operations could just as easily be performed separately (with the resulting method likely slower than what is described here).

For pixels along the border of an image (for example, pixels near column 0, column (Ncol−1), row 0, or row (Nrow−1)) some special treatment may be appropriate. At least two options are available to address this circumstance.

By one approach, each pixel remains a member of OverlapFactor$^2$ overlapping blocks. Some blocks will extend outside the image and hence will cover pixels that do not exist. For blocks near the edge of the image, it may therefore be stipulated that one does not look outside the blocks when looking for minimum and maximum level values. Or, equivalently, one may stipulate that pixels outside the image shall have the same value as the closest pixel that is inside the image. One may then apply only apply the aforementioned a and b correction to pixels which actually exist.

By another approach, blocks can be prohibited from extending outside the edge of the image. In this case, pixels near the edge of the image will fall into fewer blocks than pixels in the rest of the image. For border pixels, then, fewer blocks can be averaged together. For those pixels, then, instead of dividing a and b by OverlapFactor$^2$, this process can provide instead for dividing by the number of blocks that contain that pixel.

Figure 8:
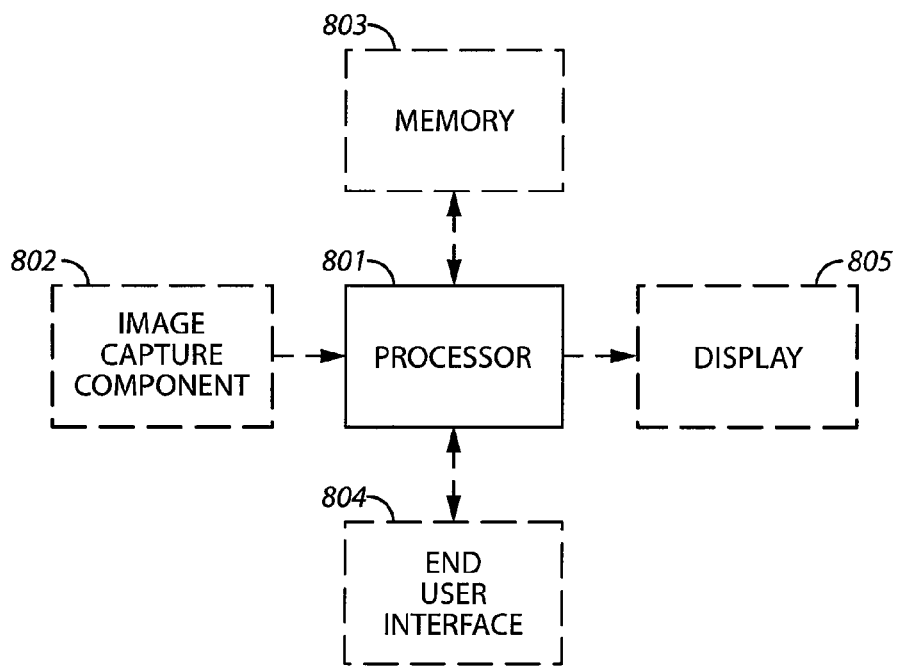
FIG. 8 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 8, an illustrative approach to such a platform will now be provided.

This apparatus 800 can comprise, for example, a computer having a processor 801 of choice. Those skilled in the art will recognize and appreciate that such a processor 801 can comprise a fixed-purpose hard-wired platform or can comprise a partially or wholly programmable platform. All of these architectural options are well known and understood in the art and require no further description here.

This processor 801 can operably couple to an image capture component 802 of choice to permit the processor 801 to receive the aforementioned image. The processor 801 can also operably couple to an optional memory 803 which can serve to store programming instructions and/or the image and processing results described herein. An end user interface 804 can also optionally be provided and operably coupled to the processor 801. Such an end user interface 804 can serve, for example, to permit an end user to input the aforementioned weighting factor, block size parameters, and so forth. This apparatus 800 can also optionally accommodate a display 805 that operably couples to the processor 801 and which serves to provide a display of the compensated image to an end user.

By one approach, the processor 801 is configured and arranged to carry out one or more of the aforementioned steps, actions, and/or functionality. This can comprise, for example, partitioning an image into a plurality of blocks, determining grayscale level values (using a given available range of grayscale level values) for image data in each of the blocks, and then transforming these determined grayscale level values to thereby use an altered amount of the given available grayscale level values to thereby, in turn, provide rescaled grayscale level values for each of the selected blocks.

Those skilled in the art will recognize and understand that such an apparatus 800 may be comprised of a plurality of physically distinct elements as is suggested by the illustration shown in FIG. 8. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured and arranged, those skilled in the art will appreciate that these teachings, while highly effective with respect to improving an end user's ability to discern features of interest in a given image, are also highly efficient and require considerably less time and/or computational support than prior solutions in this regard. By way of comparison, prior art use of adaptive histogram equalization tends to be slow but can adapt to local changes in the image and can respond differently to different objects, whereas non-adaptive ("global") histogram equalization is relatively fast but uses a one-size-fits-all equalization function that is often unable to significantly increase local contrast, and sometimes may even impact image quality in a negative way. Those skilled in the art will appreciate that the present teachings effectively achieve the best of both of these approaches by being both fast and adaptive.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method comprising:
   at an image processing apparatus:
   partitioning an image into a plurality of blocks;
   for a selected one of the plurality of blocks, and using a given available range of grayscale level values, determining grayscale level values for image data in the selected one of the plurality of blocks to provide determined grayscale level values;
   without first calculating a block-based histogram, transforming at least some of the determined grayscale level values to thereby use an altered amount of the given available range of grayscale level values to thereby provide rescaled grayscale level values for the selected block.

2. The method of claim 1 wherein transforming at least some of the determined grayscale level values comprises rescaling the values.

3. The method of claim 1 wherein transforming at least some of the determined grayscale level values comprises applying an analytic function.

4. The method of claim 1 wherein determining grayscale level values for image data in the selected one of the plurality of blocks to provide determined grayscale level values comprises determining grayscale level values for image data within each of the plurality of blocks.

5. The method of claim 4 wherein transforming at least some of the determined grayscale level values comprises transforming at least some of the determined grayscale level values for each of the blocks for which grayscale level values have been determined.

6. The method of claim 4 wherein determining grayscale level values for image data within each of a plurality of the plurality of blocks comprises determining grayscale level values for image data within each of the plurality of blocks.

7. The method of claim 4 wherein the given available range of grayscale level values is identical for each of the blocks for which the grayscale level values has been determined.

8. The method of claim 1 wherein partitioning an image into a plurality of blocks comprises partitioning the image into a plurality of blocks as a function, at least in part, of a user-selected parameter regarding a size of the blocks.

9. The method of claim 1 wherein partitioning an image into a plurality of blocks comprises portioning the image into a plurality of blocks such that there are no gaps between any of the blocks.

10. The method of claim 9 wherein partitioning an image into a plurality of blocks further comprises partitioning the image into a plurality of blocks wherein at least some of the blocks partially overlap with one another.

11. The method of claim 10 wherein partitioning the image into a plurality of blocks wherein at least some of the blocks partially overlap with one another comprises partitioning the image into a plurality of blocks wherein at least some of the blocks partially overlap with one another as a function, at least in part, of a selection of a particular amount of overlap from amongst a plurality of available candidate amounts of overlap.

12. The method of claim 1 further comprising:
   processing a portion of the image as corresponds to the selected block as a function of the rescaled grayscale level values for the selected block to thereby provide a compensated image.

13. The method of claim 12 wherein processing a portion of the image as corresponds to the selected block as a function of the rescaled grayscale level values for the selected block comprises combining the portion of the image as corresponds to the selected block with the rescaled grayscale level values for the selected block.

14. The method of claim 12 wherein processing a portion of the image as corresponds to the selected block as a function of the rescaled grayscale level values for the selected block comprises processing a portion of the image as corresponds to the selected block as a function of weighted versions of the rescaled grayscale level values for the selected block.

15. The method of claim 14 wherein processing a portion of the image as corresponds to the selected block as a function of weighted versions of the rescaled grayscale level values for the selected block comprises processing a weighted version of the portion of the image as corresponds to the selected block with the weighted versions of the rescaled grayscale level values for the selected block.

16. The method of claim 14 further comprising:
   receiving from an end user of the image processing apparatus a selected weighting factor;
   using the selected weighting factor to determine the weighted versions of the rescaled grayscale level values for the selected block.

17. The method of claim 1 wherein transforming at least some of the determined grayscale level values comprises identifying several statistics for the selected block, analyzing their values to choose a transformation, and using the transformation to transform the determined grayscale level values to have values that thereby use the altered amount of the given available range of grayscale level values.

18. The method of claim 17 wherein transforming at least some of the determined grayscale level values to thereby use an altered amount of the given available range of grayscale level values to thereby provide rescaled grayscale level values for the selected block comprises:
- identifying a first one of the determined grayscale level values that best matches a first selection criteria;
- identifying a second one of the determined grayscale level values that best matches a second section criteria, wherein the second selection criteria is different than the first selection criteria;
- rescaling the first one of the determined grayscale level values to have a value corresponding to a value within the given available range of grayscale level values;
- rescaling the second one of the determined grayscale level values to have a value corresponding to a value within the given available range of grayscale level values;
- proportionately adjusting at least some of the remaining determined grayscale level values;

to thereby provide rescaled grayscale level values for the selected block.

19. The method of claim 18 wherein the first selection criteria comprises a least significant value and the second selection criteria comprises a most significant value.

20. The method of claim 17 wherein for a selected one of the plurality of blocks, identifying several statistics for the selected block, according to certain selection criteria comprises identifying the statistics such that pixels within the selected block that are external to the image do not influence the identifying.

21. The method of claim 1 further comprising:
- processing a portion of the image as corresponds to the selected block as a function of the rescaled grayscale level values for the selected block and the rescaled grayscale level values for any other blocks that overlap with the selected block to thereby provide a compensated image.

22. The method of claim 21 wherein re-scaling the rescaled grayscale level values for the selected block as a function of rescaled grayscale level values for another block which overlaps with the selected block to thereby provide re-scaled results comprising:
- re-scaling the rescaled grayscale level values for the selected block using a first approach when the selected block does not comprise a block at an edge of the image; and
- re-scaling the rescaled grayscale level values for the selected block using a second approach when the selected block comprises a block at an edge of the image, wherein the second approach is different from the first approach.

23. An apparatus comprising:
a processor configured and arranged to:
- partition an image into a plurality of blocks;
- for a selected one of the plurality of blocks, and using a given available range of grayscale level values, determine grayscale level values for image data in the selected one of the plurality of blocks to provide determined grayscale level values;
   - without first calculating a block-based histogram, transform at least some of the determined grayscale level values to thereby use an altered amount of the given available range of grayscale level values to thereby provide rescaled grayscale level values for the selected block.

24. The apparatus of claim 23 wherein the processor further configured and arranged to transform at least some of the determined grayscale level values by rescaling the values.

25. The apparatus of claim 23 wherein the processor is further configured and arranged to transform at least some of the determined grayscale level values by applying an analytic function.

26. The apparatus of claim 23 wherein the processor is further configured and arranged to:
- process a portion of the image as corresponds to the selected block as a function of the rescaled grayscale level values for the selected block to thereby provide a compensated image.

27. The apparatus of claim 26 wherein the processor is further configured and arranged to process a portion of the image as corresponds to the selected block as a function of the rescaled grayscale level values for the selected block by combining the portion of the image as corresponds to the selected block with the rescaled grayscale level values for the selected block.

28. The apparatus of claim 27 wherein the processor is further configured and arranged to process a portion of the image as corresponds to the selected block as a function of the rescaled grayscale level values for the selected block by processing a portion of the image as corresponds to the selected block as a function of weighted versions of the rescaled grayscale level values for the selected block.

* * * * *